(12) United States Patent  
Carroscia

(10) Patent No.: US 7,410,111 B2
(45) Date of Patent: Aug. 12, 2008

(54) GUIDE RING FOR COILED WIRE

(75) Inventor: Michael A. Carroscia, Newbury, OH (US)

(73) Assignee: Lincoln Global, Inc., Santa Fe Springs, CA (US)

( * ) Notice: Subject to any disclaimer, the term of this patent is extended or adjusted under 35 U.S.C. 154(b) by 249 days.

(21) Appl. No.: 11/424,714

(22) Filed: Jun. 16, 2006

(65) Prior Publication Data

US 2007/0290093 A1   Dec. 20, 2007

(51) Int. Cl.
*B65H 59/06* (2006.01)
*B65D 85/67* (2006.01)

(52) U.S. Cl. .............. 242/171; 242/128; 242/156.1; 242/423.1; 206/408; 206/409

(58) Field of Classification Search ............ 242/156, 242/156.1, 156.2, 423.1, 566, 593, 128, 129, 242/17, 172; 206/397, 398, 408, 409
See application file for complete search history.

(56) References Cited

U.S. PATENT DOCUMENTS

| 2,864,565 | A | * | 12/1958 | Whearley | ............... | 242/128 |
|---|---|---|---|---|---|---|
| 4,582,198 | A | | 4/1986 | Ditton | | |
| 4,869,367 | A | | 9/1989 | Kawasaki et al. | | |
| 5,105,943 | A | | 4/1992 | Lesko et al. | | |
| 5,277,314 | A | | 1/1994 | Cooper et al. | | |
| 5,494,160 | A | | 2/1996 | Gelmetti | | |
| 5,819,934 | A | | 10/1998 | Cooper | | |
| 5,845,862 | A | * | 12/1998 | Cipriani | ............... | 242/423.1 |
| 6,016,911 | A | | 1/2000 | Chen | | |
| 6,019,303 | A | | 2/2000 | Cooper | | |
| 6,155,421 | A | | 12/2000 | Cooper | | |
| 6,260,781 | B1 | | 7/2001 | Cooper | | |
| 6,564,943 | B2 | | 5/2003 | Barton et al. | | |
| 6,636,776 | B1 | | 10/2003 | Barton et al. | | |
| 6,648,141 | B2 | | 11/2003 | Land | | |
| 6,649,870 | B1 | | 11/2003 | Barton et al. | | |
| 6,745,899 | B1 | | 6/2004 | Barton | | |
| 6,889,835 | B2 | | 5/2005 | Land | | |
| 6,913,145 | B2 | | 7/2005 | Barton et al. | | |
| 6,938,767 | B2 | | 9/2005 | Gelmetti | | |
| 6,977,357 | B2 | | 12/2005 | Hsu et al. | | |

(Continued)

FOREIGN PATENT DOCUMENTS

DE    10360466    7/2005

(Continued)

*Primary Examiner*—William A Rivera
(74) *Attorney, Agent, or Firm*—Hahn Loeser & Parks, LLP; Timothy D. Smith

(57) ABSTRACT

A payoff ring constructed from high density polyethylene includes a beveled inner circumference that guides ductile wire, such as aluminum welding wire, from a coil packaged in a box-like container. The body of the payoff ring is fashioned with holes or cavities that significantly reduce the weight of the payoff ring by up to 50% of the overall weight. The payoff ring floats freely in the box-like container and guides the wire as it is being withdrawn from the container while not distorting the wire. The outer configuration of the payoff ring is constructed to engage to the sides of the container thereby preventing the payoff from rotating during use.

21 Claims, 3 Drawing Sheets

U.S. PATENT DOCUMENTS

| | | |
|---|---|---|
| 7,004,318 B2 | 2/2006 | Barton |
| 7,178,755 B2 * | 2/2007 | Hsu et al. ................ 242/423.1 |
| 7,198,152 B2 * | 4/2007 | Barton et al. ............... 206/409 |
| 2003/0052030 A1 | 3/2003 | Gelmetti |

FOREIGN PATENT DOCUMENTS

| | | |
|---|---|---|
| EP | 1295813 | 3/2003 |
| WO | 2005061168 | 7/2005 |

* cited by examiner

GUIDE RING FOR COILED WIRE

TECHNICAL FIELD

The present invention pertains to a ring for dispensing coiled wire, and more particularly, to an ultra-light payoff ring used for unraveling coiled welding wire from a container.

BACKGROUND OF THE INVENTION

Wire is frequently packaged and stored in box-like containers for delivery to an end user. In particular, wire, such as that used for welding or soldering, is wound in spirals and placed in the box-like container. Once shipped to the end user, the wire may be removed from the container for use in any number of processes. In many instances, the wire is left in the container and dispensed as needed without removing the entire coil.

Typically, dispensing wire from reels or coils presents the problem of unwinding the wire uniformly without forming bumps or undesirable twists in the wire, which can lead to defects or breakage of the wire causing laborious downtime. Solutions intent on obviating these problems have been previously implemented using a payoff ring having a central hole for guiding the wire during the unwinding process. The ring is placed inside the container on top of the coil and a wire end fed through the central hole. The hole in payoff ring is smaller than the inner diameter of the coiled wire bundle. When the wire is drawn from the coil inside the container, it contacts the payoff ring around the periphery of the central hole. As the coil of wire recedes, the payoff ring descends with gravity remaining in constant contact with the top surface of the coil.

Wire may be drawn from the reel or coil at various rates. Depending on the application, the rate of unwinding may change with demand, as in the case of welding wire drawn through a wire feeder. The wire feeder adjusts the rate of draw proportionate to various welding parameters of the welding process. However, there is resistance against the wire drawn through the payoff ring in the form of friction. Coefficients of friction of course vary with material type of both the wire and the payoff ring. Frictional resistance is also dependent on normal forces between the contacting surfaces. Certain types of wire drawn through a payoff ring experience tension stress that distorts the wire causing unwanted defects in the wire.

One type of wire that distorts in this manner is aluminum welding wire, which is more ductile than steel wire. Certain alloys of aluminum wire, for example 4043 Aluminum, are very soft and ductile. Drawing aluminum wire having these characteristics over a typical payoff ring may cause the wire to inelastically deform making it unusable for its intended purpose. However, without a payoff ring the wire will twist as extra loops of the wire pull off of the coil. What is needed is an improved payoff ring which does not distort the wire as it is drawn from the coil while preventing the wire from twisting and kinking.

The embodiments of the subject invention obviate the aforementioned problems by providing a wire guiding device that is constructed to reduce forces due to frictional contact between the wire being dispensed and the wire guiding device, while reducing and/or eliminating undesirable twists in the wire.

BRIEF SUMMARY

In accordance with the embodiments of the invention, a wire guiding device is provided that may be used to guide ductile wire, such as aluminum wire or aluminum welding wire wound in a coil and stored in a container. The wire guiding device may include a guide plate having a planar first side and an aperture fashioned substantially in the center of the guide plate. The guide plate may also include an outer rim portion contoured to prevent rotation of the guide plate within the container but remains free floating with respect to the walls of the associated container. The device further comprises a wire-contact ring portion extending from an inner circumferential edge of the guide device wherein a plurality of ribs are fashioned extending between the outer rim portion and the inner circumferential edge segmenting cavities within the body portion.

One aspect of the embodiments of the subject invention includes a beveled wire-contact ring portion.

In another aspect of the embodiments of the subject invention, the guide device is substantially homogenous and may be constructed from a light weight polymer, such as polyethylene, having a low coefficient of friction.

Yet another aspect of the embodiments of the subject invention includes a guide plate wherein the volumetric region of the cavities of the body portion is greater than volume of material of the wire guiding device.

In another embodiment of the invention a device for dispensing ductile wire includes a box-like container having one or more side walls extending from a bottom portion wherein the side walls are contiguously fashioned forming one or more corners. The device further includes a guide plate having an aperture fashioned substantially in the center of the guide plate and having an outer rim portion contoured to engage the corners of the box-like container. A wire-contact ring portion extends from an inner circumferential edge of the guide plate, wherein the guide plate comprises a plurality of ribs extending between the outer rim portion and the inner circumferential edge segmenting cavities within the body portion.

One aspect of the embodiments of the invention includes an outer rim portion that is polygonal having four or eight apices for engaging the corners of the box-like container.

DETAILED DESCRIPTION OF THE INVENTION

Figure 1:
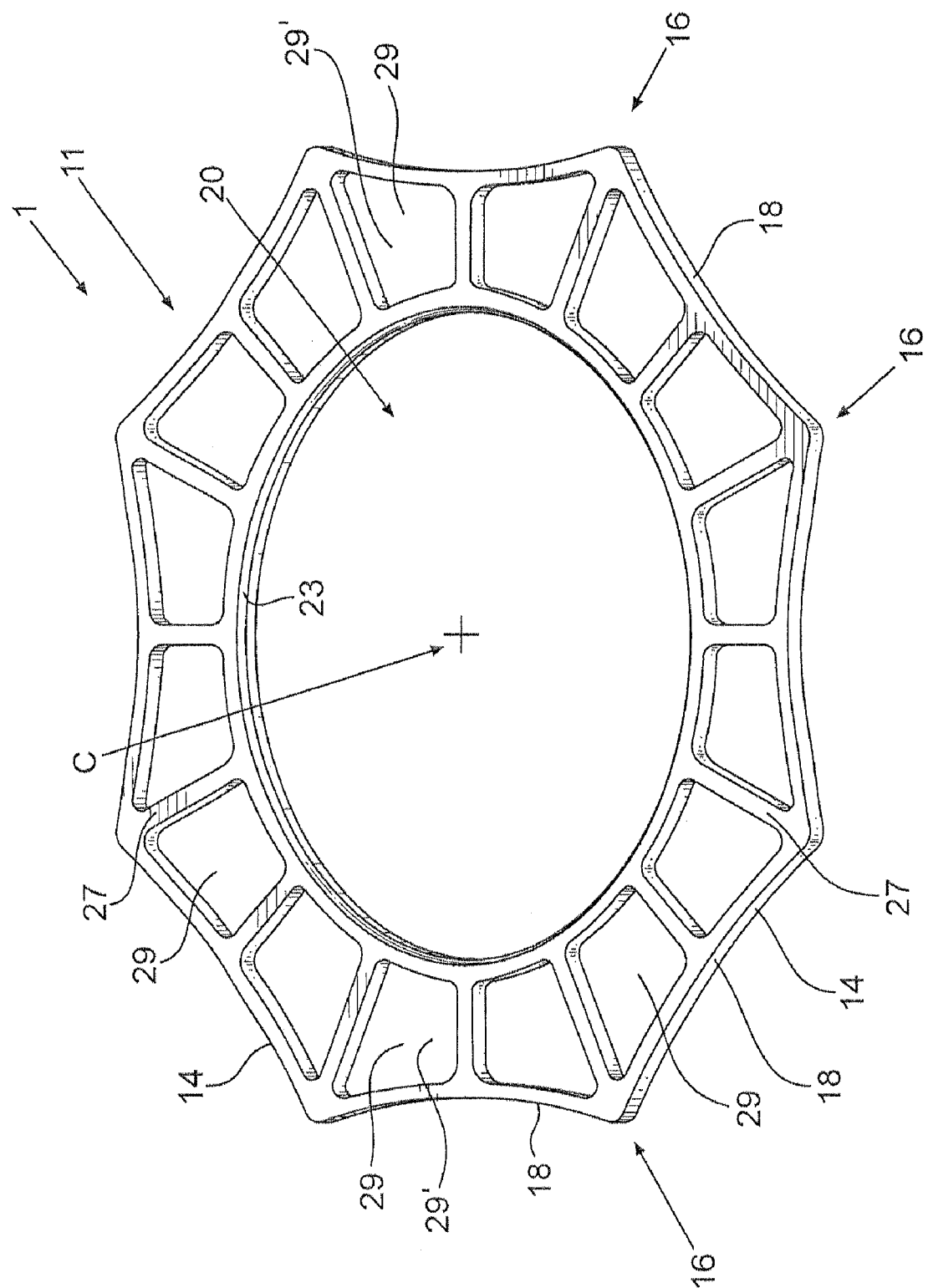
FIG. 1 is a perspective view of a wire guiding device according to the embodiments of the subject invention.

Referring now to the drawings wherein the showings are for purposes of illustrating embodiments of the invention only and not for purposes of limiting the same, FIG. 1 shows a wire guiding plate depicted generally at 1. The wire guiding plate 1 may be utilized to unwind wire 3 from a wire coil 5 stored in a container 8. In one embodiment, the wire 3 may be welding wire 3' used in the welding process to join metals together in a process well known in the art. The welding wire 3' may come packaged in a box-like container 8 constructed from cardboard or other resilient material suitable for packaging, storing and shipping welding wire 3'. As coils of welding wire 3' need replenished when depleted, it may be advantageous to provide relatively large coils of welding wire 3' to keep the operator from having to replenish coils 5 as frequently. As such, welding wire 3' may be bundled in coils 5, along with the corresponding containers 8, weighing hundreds of pounds. In one embodiment, a container 8 for storing and dispensing welding wire 3' may have dimensions of substantially a twenty-three (23) inch square base by thirty-six (36) inches in height. Wire stored in the container 8 may range in weight from 300 to 1000 pounds. For example, aluminum welding wire coiled for storage in the container 8 this size may weigh approximately 300 pounds, while steel welding wire for the same size coil may weigh nearly 1,000 pounds. It will be understood by a person of ordinary skill in the art that other characteristics change with the type and alloy of wire such as ductility. These characteristics may determine how much the welding wire is distorted during the unwinding process as will be discussed further in a subsequent paragraph. While the aforementioned describes, in an exemplary manner, a particular size of container, it is to be construed that the embodiments of the subject invention may be utilized with any size container and/or coil of welding wire chosen with sound engineering judgment.

Figure 2:
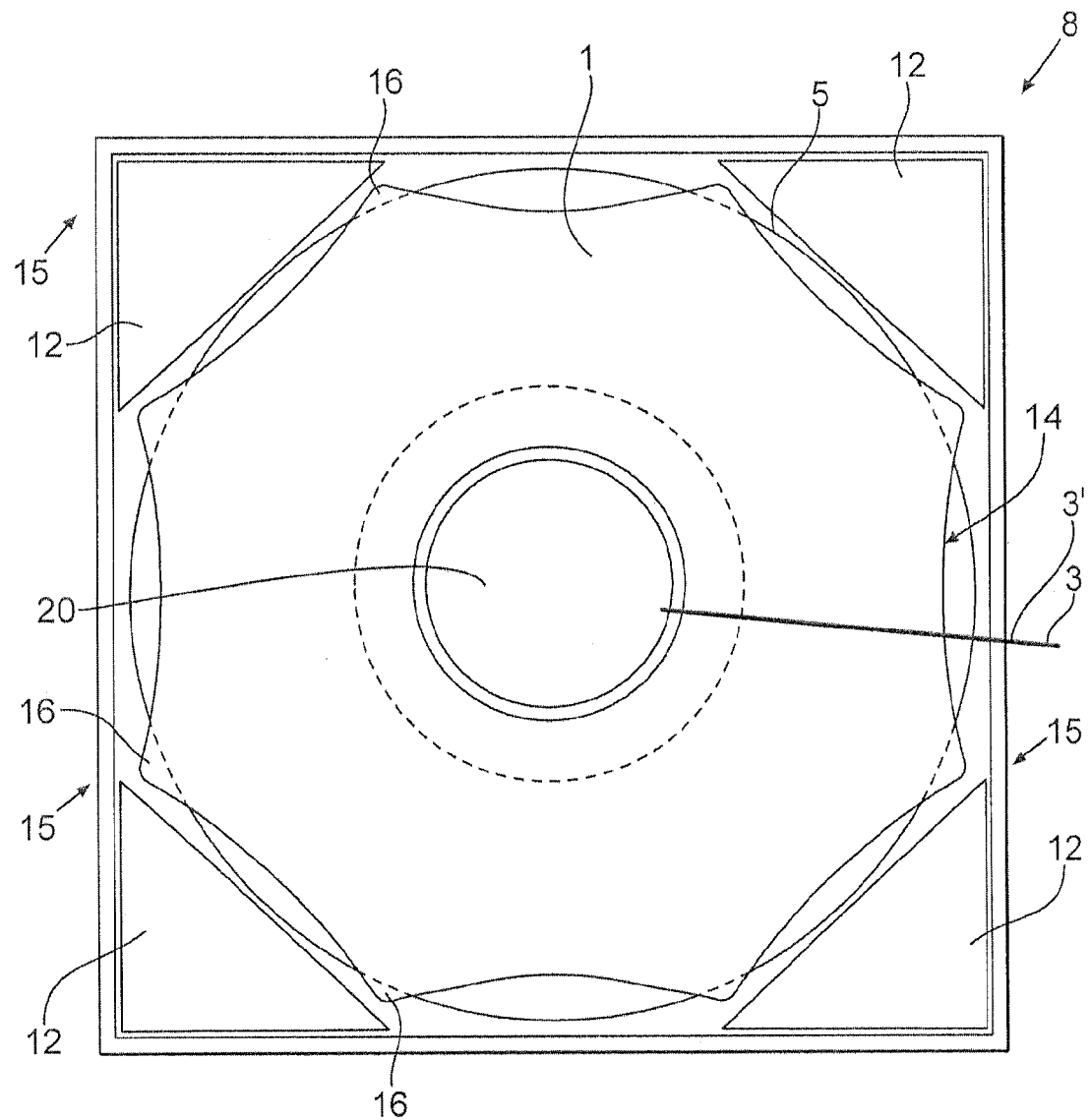
FIG. 2 is a top view of a wire guiding device placed inside a container according to the embodiments of the subject invention.

With reference to FIG. 2, the container 8 may include one or more inserts 12 placed at the corners of the container 8. The inserts 12 may have a triangular cross section and a height substantially equal to the height of the container 8. In one embodiment, four triangular shaped inserts 12 are placed one at each of the four corners of the container 8 forming an internal polygonal shape, which in this embodiment is octagonal. The inserts 12 may be used to hold the coil 5 in place. It is noted here that any number of inserts 12 and any configuration thereof may be chosen as is appropriate for use with the embodiments of the subject invention.

With reference again to FIG. 2, typically coils 5 of wire 3 are formed by splaying many loops of wire within the container 8 thereby forming the coil 5. The loops are placed consecutively on top of each other in an angled or crisscross configuration, wherein the wire forms an acute angle with respect to a horizontal axis. As mentioned above, dispensing the wire 3 from the coil 5 may cause twists or kinks in the wire 3 as more than one loop of the coiled wire 3 attempts to rise off of the coil. This results in defects causing the wire 3 to become unsuitable for use in some circumstances. Therefore, a wire guiding plate 1, also termed "payoff ring," may be utilized to minimize damaged to the wire 3 during use.

With continued reference to FIG. 2, the wire guiding plate 1 may be placed on top of the coil 5 for guiding the wire 3 as it is unraveled. A first end of the wire 3 may be fed through an aperture in the wire guiding plate 1. The wire guiding plate 1 may thereafter lay juxtaposed on top of the coil 5 preventing extra loops of the wire 3 from prematurely lifting off of the coil 5. The coil 5 of wire 3 will continuously reduce in size as the wire is dispensed. As the height of the coil 5 diminishes, the wire guiding plate 1 may descend freely downward with gravity inside the container 8 applying a constant downward force on the remaining portion of the coil 5. This functions to limit kinks in the wire 3 as it being drawn for use in a particular process, such as welding.

With reference now to FIG. 1, as mentioned above certain types of wire distort with the use of devices of this type, for example 4043 Aluminum wire. Therefore the wire guiding plate 1 may be constructed having a light weight configuration for use with material of this type as presently discussed. The wire guiding plate 1 may be molded from a light weight polymer having sufficiently rigid characteristics for use with the embodiments of the subject invention. One such material that may be used is high-density polyethylene or HDPE, which provides ample rigidity along with a low coefficient of friction, of which the importance will be discussed in detail below. The wire guiding plate 1 may be molded via injection molding or any other process including but not limited to machining the wire guiding plate 1 from a solid single piece of material.

The wire guiding plate 1 may be fashioned having at least one side being substantially planar or flat for contact with the coil 5 of wire 3. However, both sides of the wire guiding plate 1 may be planar making the wire guiding plate 1 symmetrical with respect to a center plane. The wire guiding plate 1 may be approximately ¼ inch thick. However, any thickness may be chosen as is appropriate for use with embodiments of the subject invention. The wire guiding plate 1 may also be generally uniform in thickness across the plate 1 having a substantially homogenous structure thereby evenly distributing the weight over the coil 5.

The wire guiding plate 1 may comprise a body portion 11 defining an outer rim 14. The outer rim 14 may be polygonal in its configuration thereby forming apices 16 equidistantly spaced around the circumference of the wire guiding plate 1. The number of sides may be equal to or greater than four (4). In one embodiment, the number of sides 18, and of course corresponding apices 16, may be eight (8). The apices 16 may function to engage the corners of the container 8 thereby inhibiting rotation of the wire guiding plate 1 within the container 8. As mentioned above, the container 8 may include inserts 12 that fit within the corners of the container 8. Four inserts 12 may create an internal octagonal shape having eight vertices 15. In one embodiment, the wire guiding plate 1 may be fashioned having a number of apices 16 that correspond to the number of vertices 15 in the container 8. At the same time, the wire guiding plate 1 may fit loosely within the container overlapping the outer diameter of the coil 5. That is to say that the outer perimeter of the wire guiding plate 1 is smaller than a circle inscribing the internal cross section of the container 8 and larger than the outer diameter of the coil 5. This allows the wire guiding plate 1 to descend or move vertically uninhibitedly as the height of the coil 5 decreases. In this manner, the wire guiding plate 1 floats freely within the container 8 while being juxtaposed to engage the sides of the container 8 thereby preventing rotation of the wire guiding plate 1.

Figure 3:
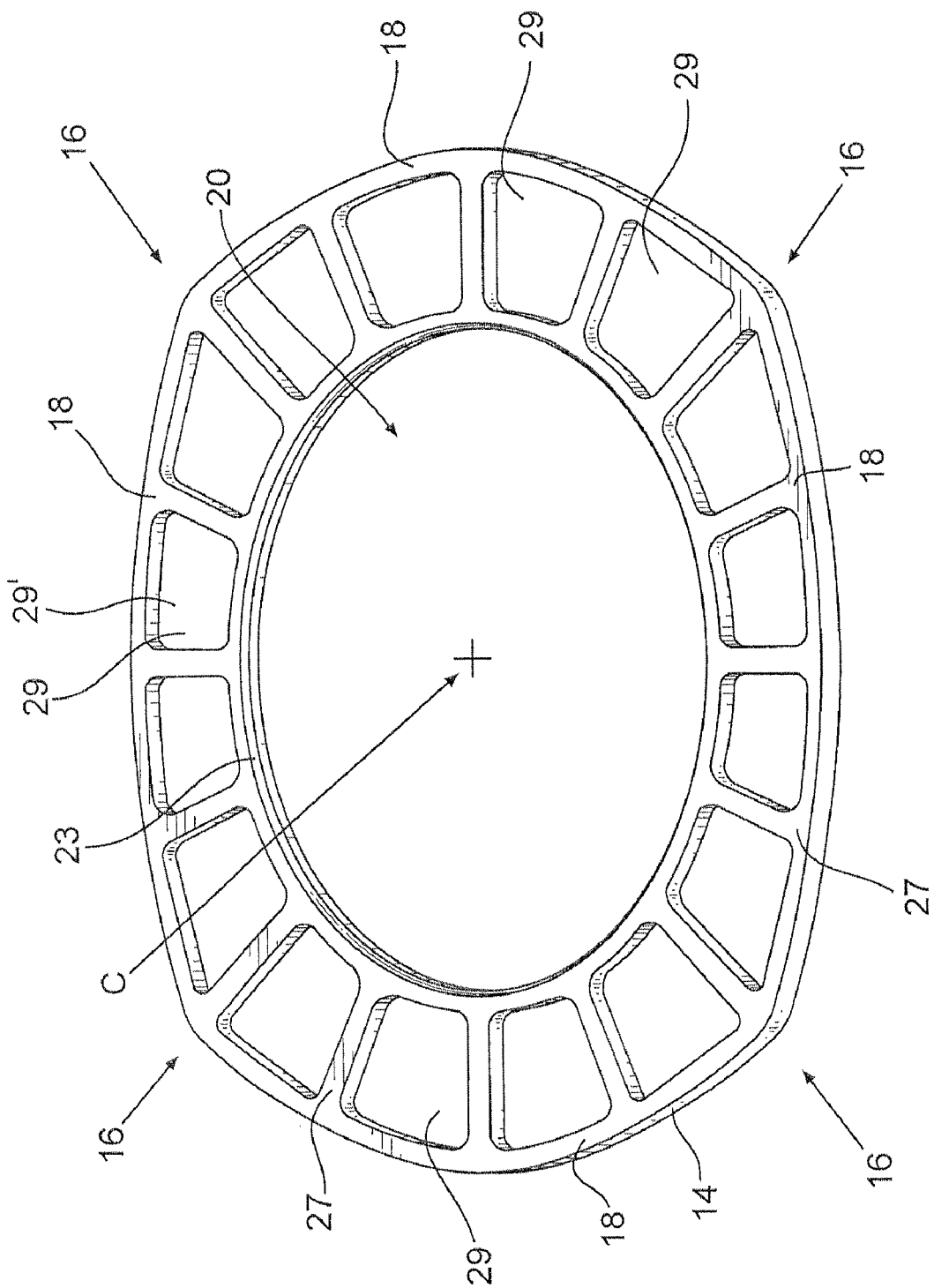
FIG. 3 is a perspective view of an alternate embodiment of a wire guiding device according to the embodiments of the subject invention.

An alternate embodiment of the invention will now be described. With reference to FIG. 3, the wire guiding plate 1 may be constructed having four (4) apices 16. The apices 16 may correspond to the number of vertices 15 of the container 8. However, it is noted that a wire guiding plate 1 having four (4) apices may be utilized with container 8 having a different number of vertices 15. The sides 18, extending between the apices 16, may be convex with respect to a center C of the wire guiding plate 1. That it is to say that side 18 may be curved outward with respect to the center C. However, while the current embodiment is described having convex sides 18, the wire guiding plate 1 may include sides 18 that are concave as shown in FIG. 1. Still any configuration of sides including but not limited to convex, concave and/or linear sides may be chosen without departing from the intended scope of the embodiments of the invention.

With continued reference to FIG. 2, an aperture 20 may be fashioned substantially in the center of the wire guiding plate 1. In one embodiment, the diameter of the aperture may be smaller than the inner diameter of the coil 5 of wire 3. A wire contact ring portion 23 may extend inwardly from the inner circumference edge of the aperture 20. Each of the edges of the wire contact ring portion 23 may be rounded so that the wire 3 does not break over a sharp edge. In one embodiment, the wire contact ring portion 23 may be beveled on a first side or flat of the wire contact ring portion 23. As a first end of the wire 3 is fed through the aperture 20, the subsequent wire portions may be drawn from around the coil 5 over the edge of the wire contact ring portion 23 to a conduit leading up to a wire feeder, not shown. As mentioned above, the wire guiding plate 1 may be formed from high density polyethylene providing a low coefficient of friction guiding the wire 3 with minimal resistance. However, it is noted here that any rigid material may be used having a similar or lower coefficient of friction as chosen with sound engineering judgment. In one embodiment, the wire contact ring portion 23 is contiguously formed with the body portion 11. However, it is contemplated in an alternate embodiment, the wire contact ring portion 23 may be a separate piece adhered to the inner circumferential edge. Accordingly, the wire contact ring portion 23 may be constructed from a material different from that of the body portion 11 of the wire guiding plate 1.

With reference once again to FIG. 1, the body portion 11 of the wire guiding plate 1 may comprise a plurality of ribs 27 extending from the outer rim 14 to the inner circumferential edge of the body portion 11. The ribs 27 may be evenly spaced extending radially outward from a center point C of the wire guiding plate 1. Any number of ribs 27 may be fashioned as chosen with sound engineering judgment. In this manner, the ribs 27 may segment the wire guiding plate 1 and more specifically the body portion 11 into a plurality of sections devoid of material and its mass, i.e. weight. In one embodiment, cavities 29 may be fashioned in the body portion 11 subsequent to fashioning the overall wire guiding plate 1 thereby defining the ribs. Material may be removed from the body portion 11 in a manner well known in the art such as milling. However, it is also contemplated that the wire guiding plate 1 may be molded into a single contiguously formed item with the ribs 27 in place. It is to be construed that any manner of constructing the ribs 27 may be chosen as is appropriate for use with the embodiments of the subject invention. The cavities 29 may extend completely through the wire guiding plate 1 forming holes in the wire guiding plate 1. The cavities 29 may alternatively be fashioned extending from a first side of the wire guiding plate 1 but stopping short of the second side of the wire guiding plate 1 thereby forming pockets 29'. This increases the surface area of wire guiding plate 1 while still substantially reducing it's mass. In one embodiment, the base of the pocket 29' may be approximately 0.030 inches thick, although any thickness may be chosen with sound engineering judgment. The cavities 29, in aggregate, may comprise a volumetric region, and hence a corresponding weight, that exceeds the remaining volume and weight of the wire guiding plate 1. Accordingly, the total weight of the wire guiding plate 1 may range from between 300 to 400 grams. In one embodiment, the weight of the wire guiding plate 1 may be substantially 380 grams. However, any configuration and/or volumetric region of cavities 27, and any corresponding thickness of ribs 27 may be chosen with sound engineering that allows the wire 3 to channel through the wire guiding plate 1 without significantly distorting the wire 3.

The invention has been described herein with reference to several embodiments. Obviously, modifications and alterations will occur to others upon a reading and understanding of this specification. It is intended to include all such modifications and alternations in so far as they come within the scope of the appended claims or the equivalence thereof.

What is claimed is:

1. A wire device for guiding wire from a coil stored in a container, the container having side walls extended from a bottom portion of the container, the device comprising:
   a guide plate having a generally planar first side, the guide plate having an aperture defining an inner circumferential edge fashioned substantially in the center of the guide plate, the guide plate having at least a first outer rim portion extending outside a circumference of the associated coiled wire, wherein the guide plate is free floating with respect to the side walls of the associated container; and,
   wherein the guide plate includes a plurality of ribs extending between the other rim portion and the inner circumferential edge segmenting cavities within the guide plate.

2. The device as recited in claim 1, further comprising:
   a wire contact ring portion extending from an inner circumferential edge of the guide plate.

3. The device as recited in claim 1, wherein the inner circumferential edge is beveled.

4. The device as recited in claim 1, wherein the wire contact ring portion is beveled.

5. The device as recited in claim 1, wherein the guide plate is substantially homogenous.

6. The device as recited in claim 1, wherein the guide plate is constructed from high density polyethylene.

7. The device as recited in claim 1, wherein the volume of the cavities is greater then the volume of material of the material of the wire guiding device.

8. The device as recited in claim 1, wherein the contour of the outer rim portion is polygonal.

9. The device as recited in claim 1, wherein the weight of wire guiding device is less then 400 grams.

10. The device as recited in claim 9, wherein the weight of wire guiding device is substantially 380 grams.

11. A wire device for unraveling wire stored in c container, comprising:
    a guide plate having an aperture fashioned substantially in the center of the guide plate, the guide plate having a polygonal outer rim contoured to prevent extra loops of the associated wire from prematurely lifting off the coil; and,
    wherein the guide plate includes a body portion having one or more cavities fashioned in the body portion.

12. The device as recited in claim 11, wherein the polygonal outer rim is octagonal having eight apices equidistantly spaced around the outer rim wherein at least a first portion of the polygonal outer rim extends outside a circumference of the associated coiled wire.

13. The device as recited in claim 12, wherein the volumetric region of the cavities exceeds the volumetric region of the wire guiding device.

14. The device as recited in claim 13, wherein the body portion is constructed from a substantially homogenous material.

15. The device as recited in claim 14, wherein the body portion is constructed from polyethylene.

16. A device for dispensing ductile wire, comprising:
    a box like container having a plurality of side walls extending from bottom portion, the side walls being fashioned one or more corners;
    a guide plate having an aperture fashioned substantially in the center of the guide plate, a guide plate having an outer rim portion contoured to prevent extra loops of associated wire from prematurely lifting off of the coil; and,
    wherein the guide plate comprises a plurality of ribs extending between the outer rim portion and an inner circumferential edge segmenting cavities within the body portion.

17. The device as recited in claim 16, further comprising:
    one or more inserts received by the corners of the box like container.

18. The device as recited in claim 17, wherein the one or more insets comprise four inserts; and, wherein the cross section of the box like container is octagonal.

19. The device as recited in claim 18, wherein the outer rim portion is polygonal having eight apices for engaging the octagonal corners of the box like container.

20. The device as recited in claim 16, wherein the guide plate is free floating with respect to the walls of the associated container.

21. The device as recited in claim 16, wherein the volumetric region of the cavities extends the volumetric of the guide plate.

* * * * *

UNITED STATES PATENT AND TRADEMARK OFFICE
CERTIFICATE OF CORRECTION

PATENT NO. : 7,410,111 B2  Page 1 of 1
APPLICATION NO. : 11/424714
DATED : August 12, 2008
INVENTOR(S) : Michael A. Carroscia It is certified that error appears in the above-identified patent and that said Letters Patent is hereby corrected as shown below:

In the claims:

Claim 1 - Col 5 ln 61 - insert --guiding-- between "wire" and "device".
Claim 1 - Col 6 ln 6 - "other" should be "outer".
Claim 7 - Col 6 ln 21 - change the word "then" to "than".
Claim 7 - Col 6 ln 22 - remove "material of the".
Claim 9 - Col 6 ln 26 - insert the word --the-- before the word "wire" and change the word "then" to "than".
Claim 10 - Col 6 ln 28 - insert the word --the-- before the word "wire".
Claim 11 - Col 6 ln 29 - insert the word --guiding-- after the word "wire" and change the word "c" to "a".
Claim 11 - Col 6 ln 34 - insert the word --of-- after the word "off".
Claim 16 - Col 6 ln 54 - insert the word --a-- after the word "from" and insert the word --forming-- after "fashioned".
Claim 16 - Col 6 ln 57 - change the word "a" to "the".
Claim 18 - Col 7 ln 2 - change the word "insets" to "inserts".
Claim 21 - Col 8 ln 5 - change the word "extends" to "exceeds" and insert the word --region-- before "of the guide plate".

Signed and Sealed this

Thirtieth Day of December, 2008

JON W. DUDAS
*Director of the United States Patent and Trademark Office*